United States Patent Office 3,166,699
Patented Jan. 19, 1965

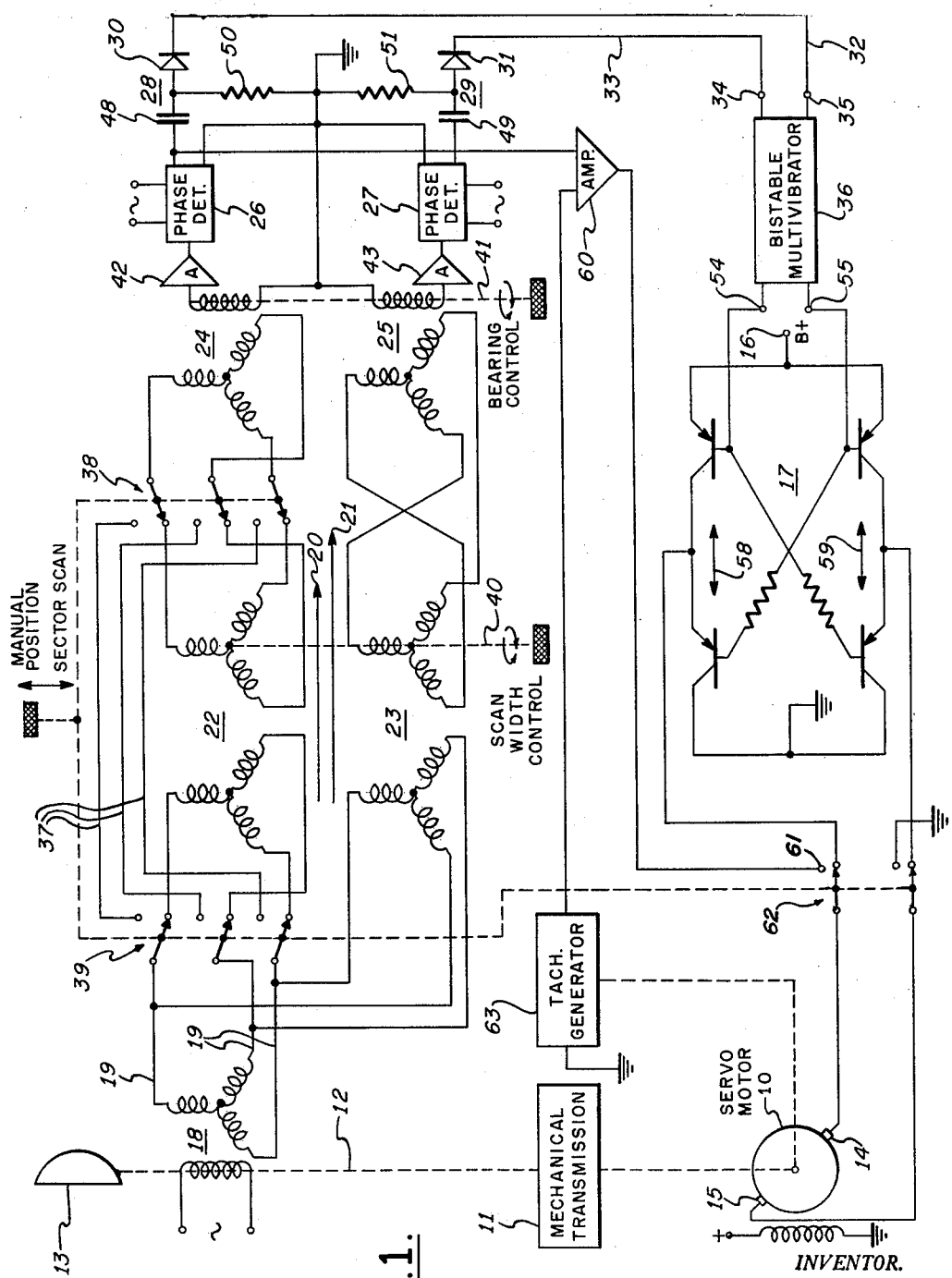

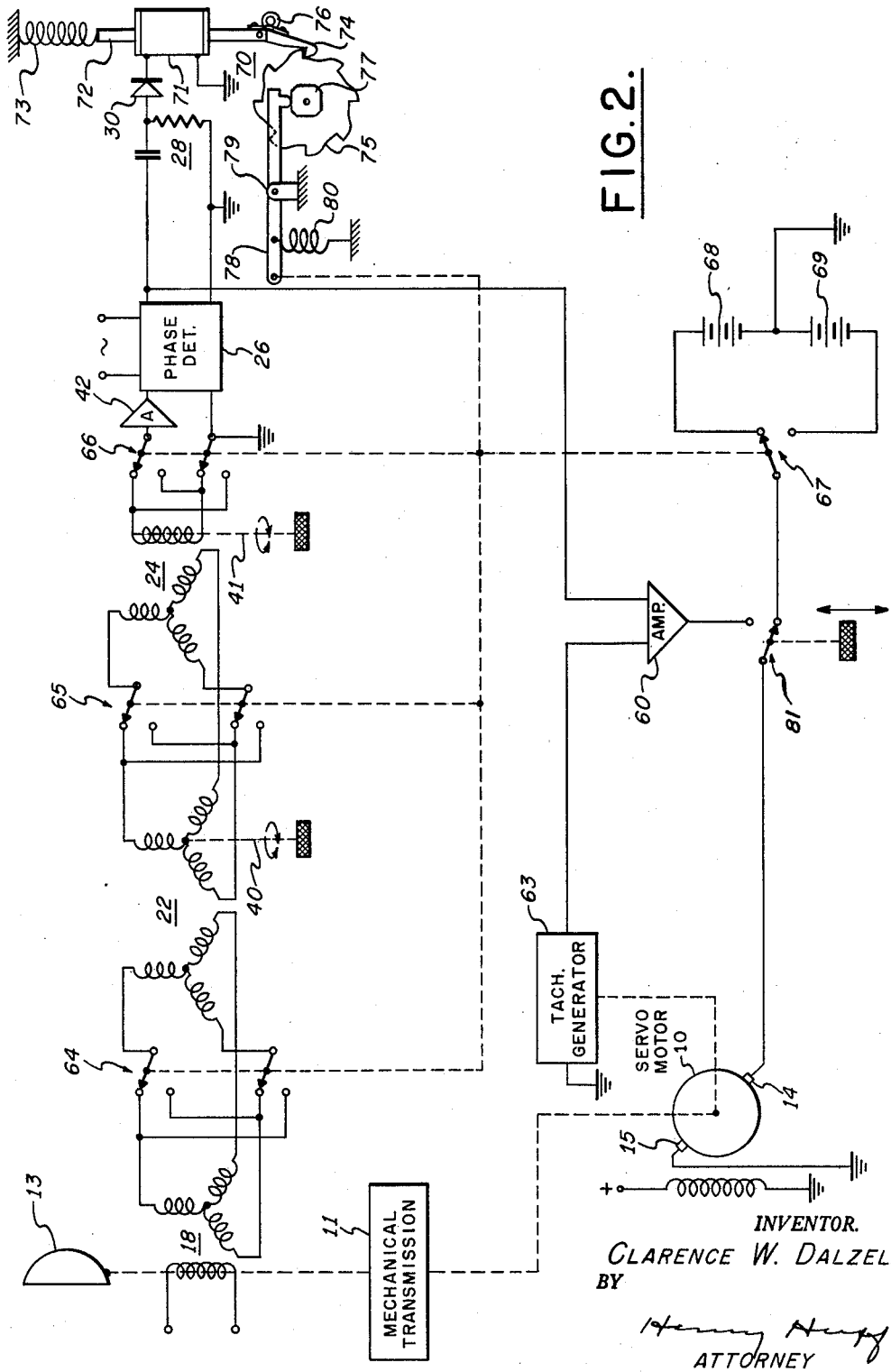

3,166,699
REVERSIBLE MOTOR CONTROL FOR SECTOR
SCANNING SYSTEM
Clarence W. Dalzell, Garden City, N.Y., assignor to
Sperry Rand Corporation, Great Neck, N.Y., a corporation of Delaware
Filed June 9, 1961, Ser. No. 116,074
13 Claims. (Cl. 318—30)

This invention relates generally to sector scanning systems of the type controlled by a reversible motor and more particularly it concerns an improved means for establishing sector limits of scanning antennas.

Many airborne radar systems require that the antenna scan continuously over a sector of predetermined width which may be anywhere from nearly zero to 360°. It is important that the bearing and width of scan be maintained in precise manner in spite of variations in scan speed as well as changes in atmospheric conditions.

Antenna sectoring is often accomplished by means of limit switches set to be tripped by the antenna as it reaches the extremities of its scanned sector. These switches are connected to reverse the phase or polarity of the inputs to the antenna drive motor. This technique suffers, however, from difficulty in accurately adjusting the scan sector width and bearing. Furthermore the presence of switches in the vicinity of the antenna itself results in undesired radio frequency noise signals at the radar receiver.

Other antenna scanning systems utilize means such as synchro transmitters which generate voltages proportional to the antenna rotational position. When this voltage reaches a predetermined value a relay is activated or a thyratron is fired to effect switching of the inputs to the drive motor. Although this technique permits remote control of the sector width and/or position, and to a certain extent eliminates switching noise interference, its accuracy is limited by variations in antenna scan speed and changes in atmospheric conditions which may affect the firing point of voltage sensitive devices. Another limitation of the synchro type transmitter results from the fact that the magnitude of its output voltage is a sinusoidal function of the displacement of its rotor. Thus while changes in antenna rotation may be quite accurately and linearly represented in the vicinity of a given reference point, changes in the synchro output rapidly become indistinguishable when the antenna reaches the vicinity of 90° from that point. This results in inaccurate scanning for all but very narrow sector widths. Furthermore even should such inaccuracies be tolerated or even overcome, conventional synchro systems will produce undesired switching for every 180° of rotation, thus limiting the scan width to that value.

Finally none of the above-mentioned prior art systems is readily adaptable to a servo type mode of operation wherein the antenna may be remotely positioned at a fixed bearing.

Consequently, it is an object of this invention to provide an improved rotational reversing device in which the reversal point is accurately maintained regardless of rotational speed or position.

It is another object of this invention to provide such a device wherein the reversal of a rotating element may be effected anywhere from nearly zero to 360° from its starting point.

It is another object of this invention to provide an easily adjustable sector scanning system incorporating such a reversing device.

Another object is to provide such a sector scanning system wherein there is a minimum number of relay switches and other moving parts.

A still further object is to provide such a sector scanning system which is adaptable to servo type operation with a minimum of complexity.

These and other objects of the invention are realized in the following manner. A reversing means is provided. This includes a synchro type data transmission device for generating a signal having a characteristic, such as phase, which shifts abruptly between two alternate states for each 180° of antenna rotation. The sudden changes in phase are detected and differentiated to produce corresponding pulses. The positive going pulses are selected and are applied to a bistable pulse actuated switching means which reverses the inputs to the antenna drive motor. The point at which reversal takes place may be controlled by varying the relative rotational positions of the windings of differential generators, synchro generators or control transformers in the data transmission systems. Sectoring is accomplished by operating two of these reversing means in parallel, the output of the differentiating circuit of each reversing means being applied to one of two inputs of the bistable switching means. In an alternate embodiment duplicate elements in the two reversing means may be eliminated by providing further switching means in a manner to be shown. A manual position mode of operation is easily provided by connecting an amplifying means between the output of the phase detector and the input to the drive motor.

Referring now to the figures:

FIG. 1 is a schematic illustrating a preferred embodiment of the invention; and

FIG. 2 is a schematic illustrating an alternate embodiment employing the principles of the present invention.

In FIG. 1 a D.C. servomotor 10 is shown with its armature connected through a mechanical transmission 11 and an antenna drive shaft 12 to a scanning antenna 13. The speed and direction of rotation of the motor are governed respectively by the magnitude and direction of current applied at the input terminals 14 and 15, of the motor armature winding. This current is supplied from a source 16 and is controlled by means of a transistorized bridge type switching circuit 17.

A synchro generator or synchro generating means 18 has its rotor connected to the antenna drive shaft 12. The rotor is excited with an alternating voltage supplied from a reference source (not shown). Antenna position information is transmitted to a remotely located sector control system via a triad of input leads 19.

The sector control system comprises a forward and a reverse channel respectively designated as 20–21. The two channels are similar in that each includes; a synchro differential or synchro differential means 22–23, an output synchro or output synchro means 24–25, a phase detector 26–27, a differentiating circuit 28–29, and a diode 30–31, connected in series with an output lead 32–33. The channels distinguish from each other in that connections between the synchro generator 18, the synchro differential 23, the output synchro 25, and the phase detector 27, of the reverse channel 21 are reversed with respect to their counterparts in the forward channel. The output of each channel is connected to a corresponding input terminal 34–35, of a bistable switch actuating circuit 36. A bypass circuit 37 is provided in the forward channel along with two sets of triple ganged switches 38 and 39, located on either side of the differential 22. This permits the differential 22 to be disconnected from the forward channel during the manual position mode of operation to be described.

A scan width control shaft 40 is connected to the rotor of the differential in each channel, while an angular reference or bearing position output shaft 41 connects the rotor of each control synchro. These shafts operate to vary the width and bearing of the sector within which the antenna will scan.

The phase detectors 26 and 27 are connected to the secondary winding of the output synchros in their respective channels. Alternating voltages from the reference source are also supplied to each phase detector. The phase detectors may be of conventional construction but preferably have an associated high gain characteristic. This may be provided by means of amplifiers 42 and 43 located at their respective inputs. The amplifiers rapidly drive the phase detectors into saturation for even very small signals from the output synchros. Each phase detector output thus approximates a square wave having a period equal to that of the antenna rotation. The phase detector output leads are connected to the differentiating circuit in each channel. These circuits each comprise a capacitor 48–49 in series with a lead from each detector and a resistor 50–51 connected across the respective leads. Two of the output leads are connected to a common ground terminal while the other leads are connected through the output diodes 30 and 31, to the input terminals of the bistable switch actuating circuit 36.

The switch actuating circuit 36 is essentially a transistorized bistable multivibrator having a pair of input terminals 34 and 35 connected to the output leads 32 and 33, and a pair of corresponding output terminals 54 and 55 which are connected to the bridge switching circuit 17. A positive pulse from the forward channel differentiating circuit 28 will render the first output terminal 54 positive with respect to the second output terminal 55. The circuit will remain in this state until a subsequent pulse from the reverse channel differentiating circuit 29 renders the second output terminal 55 positive with respect to the first.

The bridge switching circuit comprises upper and lower branch portions 58 and 59, connected in parallel between the current source 16 and ground. Each branch includes first and second PNP type transistors having their emitters and collectors connected in series. Connections are made to the servomotor input terminals 14 and 15, from between the transistors in each of the branch portions of the bridge switching circuit. Connections from the output terminals 54 and 55 of the switch actuating circuit 36 are made to the bases of diagonally opposed transistors in opposite branches of the bridge switching circuit 17. Thus with one input in a highly positive state current will flow in a given direction through the motor armature while with the polarities reversed, current will flow in the opposite direction through the motor armature.

A circuit with an amplifier 60 is connected between the ungrounded output of one phase detector and a switch terminal 61 in the vicinity of one of the connections to the servomotor. This circuit includes a conventional D.-C. power amplifier capable of driving the servomotor in accordance with output signals from the upper channel phase detector 26. A switch 62 is provided to connect the servomotor to the output of the phase detector and to ground during the manual position mode of operation, thus bypassing the differentiating and switching circuits. A tachometer type generator 63 (or similar means for developing a voltage proportional to motor speed) is provided with its output connected to the amplifier 60. In this manner a rate compensated servo type operation is achieved in the manual position mode of operation.

Operation of the device shown in FIG. 1 will first be considered in the sector scan mode of operation. In this mode the triple ganged switches 38 and 39 are set to connect the differential 22 into the forward channel 20 of the sector control system. Also the double ganged switch 62 is set to connect the servomotor terminals 14 and 15 to the bridge switching circuit 17.

The rotor of the synchro generator 18 connected to the antenna drive shaft 12 induces in the stator windings a magnetic field which is aligned with the antenna position. The stator windings convert this field to alternating voltages having relative amplitudes which correspond to the magnetic field position. These voltages are supplied to both the forward and reverse channels of the control system and reproduce similarly oriented magnetic fields on the primary windings of the output synchros 24 and 25 in these channels.

While the rotors of the synchro differentials 22–23 are aligned with their respective stator windings, the magnetic field in the primary windings of both the output synchros 24–25 remains in alignment with the antenna. It should be noted however that because of the reversed leads on either side of the synchro differentials in the reverse channel the magnetic fields appearing on the windings of the two differentials will rotate in mutually opposite directions at the antenna scan speed.

When the scan width control shaft 40 is turned the rotors of both synchro differentials turn with respect to their corresponding stators by equal amounts in the same direction. The effect of this is to change the relative magnitudes of the voltages induced in the stator windings of the output synchros in each channel in such a manner that they represent magnetic fields which have been rotated by corresponding amounts. In the forward channel the magnetic field induced in the output synchro 24 will have been rotated in the same direction as the control shaft 40 is turned. In the reverse channel however, because of the reversed leads connecting the synchro differential 23 and the output synchro 25, the effect is to rotate the magnetic field induced upon the windings of that synchro by a corresponding amount in the opposite direction. Also, as stated previously, the rotation of the magnetic field in the reverse channel output synchro 25 caused by antenna rotation will be in the same direction as in the forward channel output synchro 24. Thus when the scan width control shaft 40 is turned, the magnetic fields appearing on the two synchro differentials are displaced in opposite directions to define a sector of desired width which has the true antenna position at its center and which rotates in synchronism with the antenna.

The rotors of the two output synchros 24–25 are maintained in alignment on the bearing control shaft 41 and establish a single rotational reference position lying within the sector defined by the two rotating magnetic fields. The servo drive motor 10 will rotate the antenna in one direction until the reference position is crossed by one of the rotating magnetic fields. At this point a switching signal occurs which causes the antenna to be driven in the opposite direction until the reference position is again crossed by the other rotating magnetic field. It can be seen that by adjustment of the bearing control shaft 41, the bearing of the sector about which the antenna will scan is easily positioned.

The reference position established by the output synchro rotors is a line perpendicular to their windings. When the rotating magnetic field in one of the output synchros passes through this position, the phase of the signal induced on the corresponding synchro differential rotor winding is suddenly reversed. This phase reversal is detected in the associated phase detector and differentiating circuit.

The output of the phase detector is a D.-C. voltage having a positive or negative polarity dependent upon the phase relationship between signals from its respective output synchro and an input reference signal. Since the phase of the signal on the output synchro rotor reverses instantaneously as the rotating magnetic field passes the reference position, the change from one polarity to another at the output of the phase detector also occurs in an abrupt manner. These sudden changes in polarity are converted by the differentiating circuits 28 and 29, to pulses having polarities corresponding to the direction of the changes.

It should be noted that for one complete antenna rotation the rotating magnetic field in the stator windings of each output synchro will cross the reference position twice. In one instance the shift in polarity at the output of a phase detector will be from negative to positive, causing a positive pulse to be generated by the associated differentiating circuit. In the other instance the shift in polarity will be in the opposite direction, causing a negative pulse to be generated. The negative pulses are eliminated by the diodes 30 and 31 in the output lines so that for a complete rotation of the antenna only one pulse signal is produced at the output of each channel. Thus in this system the sector width can be varied anywhere from approximately zero to 360°. Furthermore, by utilizing the sudden shift in phase of the synchro system as the pulse developing means, accurate switching is obtained irrespective of the velocity of antenna rotation or of antenna position.

The output pulses from the differentiating circuits 28–29 are applied to the corresponding terminals 34–35 in the switch actuating circuit 36. The circuit has two stable states characterized by the relative polarities produced at its output terminals 54–55. The particular state of the circuit at any given time depends upon which of its input terminals has most recently received a positive pulse. Thus the circuit produces a continuous positive voltage at one output terminal until a pulse from the proper differentiating circuit switches the positive voltage to the opposite output terminal.

The ouput terminals of the switch actuating circuit 36 are connected to the bases of diagonally opposed transistors in the bridge switching circuit 17. When the first output terminal 54 is positive, current will flow in the bridge switching circuit from the source 16 through the first transistor of the upper branch portion 58, then upward through the motor armature and through the second transistor of the lower branch portion 59 to ground. The motor will then drive in the forward direction until the rotating magnetic field in the forward channel crosses the reference position in a proper direction and abruptly changes the phase of the signal at the output of the synchro 24. Then a positive pulse will be generated at the diode 30 in the forward channel of the system. This pulse will bias the corresponding transistor in the switch actuating circuit 36 to its conducting state thus switching the positive output voltage to the second output terminal 55. Current will then flow in the bridge switching circuit from the source 16 through the first transistor in the lower branch portion 59, upward through the servomotor armature, and through the second transistor in the upper branch portion 58 to ground, thus driving the motor in the reverse direction until the rotating magnetic field in the reverse channel crosses the reference position in a proper direction, whereupon the process is repeated.

Operation in the manual position mode is initiated by setting the triple ganged switches 38 and 39 in the forward channel to the terminals of the bypass circuit 37, thus eliminating the differential generator 22 from the forward channel. Also the double ganged switch 62 in the input circuit to the servomotor is set to connect the servomotor input terminals 14 and 15 between ground and the amplified output of the phase detector 26 in the forward channel. The amplitude and polarity of the voltage at the output of the phase detector are proportional respectively to the amount and direction of rotation of the antenna from a reference point set by adjustment of the bearing control shaft 41. This voltage is amplified in the feedback amplifier 60 which provides current in the proper direction and of the proper amplitude through the armature circuit of the servomotor which in turn drives the antenna until the output of the phase detector is cancelled. A stabilizing effect on this servo type operation is provided by including in the feedback circuit a voltage proportional to servomotor speed. This voltage is generated in the tachometer generator 63 and applied to one input of the D.C. power amplifier 60.

Referring now to FIG. 2, a second embodiment of the invention is shown. In this embodiment certain elements which were identical in each channel of the embodiment of FIG. 1 are made common to both channels. Thus this system utilizes only a single synchro differential 22, output synchro 24, phase detector 26 and differentiating circuit 28 and diode 30. Double ganged channel switches 64, 65 and 66 of the single pole double throw type are provided on either side of the synchro differential 22 and output synchro 24 to switch these common elements into the characteristic portions of each channel, i.e. the reversed connections on either side of the synchro differential and output synchro in the reverse channel and the corresponding non-reversed connections in the forward channel. A motor reversing switch 67 is provided between the servo motor 10 and positive and negative current sources 68 and 69 to reverse the direction of antenna scan. The movable elements of the channel switches and the motor reversing switch are mechanically connected to and from part of a bistable switching circuit 70. Although the bistable switching circuit could take any of a variety of forms which would convert successive positive pulses from the differentiating circuit 28 to alternate positions of a movable mechanical element, an impulse ratchet type relay is shown for purposes of illustration and explanation.

Operation of this embodiment of the invention is very similar to that of FIG. 1. Antenna position information is converted to a rotating magnetic field in the stator windings of the control transformer 24. When the rotating magnetic field crosses the reference position established by the rotor position of the output synchro, the phase of the signal induced at its output is reversed. This phase reversal is detected in the phase detector 26 and converted to a pulse of corresponding polarity in the differentiating circuit 28. Positive pulses from the diode 30 are applied to the relay 70 to energize a solenoid 71 causing its core 72 to move upwardly against a restraining spring 73. A pawl 74, pivoted at one end of the core 72, is maintained in contact with the teeth of a ratchet wheel 75 by means of a spring 76. A cam member 77 is affixed to the ratchet wheel and rotates with it. As the cam member 77 rotates from one position to another, a cam follower 78 rotates in alternate directions about a fixed pivot 79. A second restraining spring 80 maintains the cam follower 78 in contact with the cam member 77 at all times. The cam follower operates the movable elements of the channel switches 64, 65 and 66 as well as the movable element of the servomotor reversing switch 67. It can be seen from the diagram that for each positive pulse generated in the differentiator 28, the solenoid and ratchet arrangement will cause the ratchet wheel 75 and cam member 77 to rotate to a new position. This causes the cam follower 78 and the movable switch elements to change from their previous positions, thus reversing the antenna drive motor as well as connecting a different channel between the antenna and the bistable switching circuit.

It is to be noted in this embodiment that the rotating magnetic field on the output synchro stator winding rotates on the same direction and at the same speed as the antenna regardless of which channel is connected. The position at any instant however, of the magnetic field will be displaced to the left or to the right of the true antenna position depending upon which channel is connected and by an amount depending upon the displacement of the rotor of the synchro differential 22. Thus when the antenna reaches one sector limit and a switching signal is produced, the opposite channel is connected to the system and the rotating magnetic field appearing on the stator windings of the control transformer appears at a new position displaced from the reference position by an amount equal to the total sector width. The antenna is then driven in the opposite direction until the magnetic field again crosses the reference position to produce another switching signal.

Operation of this system in the manual mode is identical to that of the preferred embodiment. A manual switch 81 is set to connect the servomotor input terminals to the amplified output of the phase detector. Also, as in the preferred embodiment, two triple ganged switches (not shown) may be set to bypass the differential generator 22.

While the invention has been described in its preferred embodiments, it is to be understood that the words which have been used are words of description rather than of limitation and that changse within the purview of the appended claims may be made without departing from the true scope and spirit of the invention in its broader aspects.

What is claimed is:

1. A scanning system for oscillating a rotatable element through a determined sector in relation to a determined angular reference position including a reversible D.C. motor connected to drive the element; a circuit providing a phase reversing output including synchro generating means having a rotor driven by the motor, synchro differential means connected to the generating means having stator and phase changing rotor parts adjustable angularly with respect to one another to determine the width of the scanning sector, and synchro output means connected to the differential means having stator and phase changing rotor parts adjustable angularly with respect to one another to determine the angular reference position; means for operating and reversing the direction of operation of the D.C. motor including a polarity switching circuit, and means providing a differential pulse output for operating said switching circuit depending on the adjusted output of the phase reversing circuit.

2. A system of the character claimed in claim 1, in which the included synchro differential means is a pair of synchro differentials having respective stator and rotor parts, the included synchro output means is a pair of synchros having stator and rotor parts, and the respective stator and rotor parts of the individual differentials and synchros are arranged in phase opposition in respective channels of the circuit with the respective rotor parts of the differentials and synchros connected for common adjustment.

3. A system of the character claimed in claim 2, including an open circuit for bypassing the synchro differentials and polarity switching circuit, and switching means operable to close said bypass circuit and connect the output of the phase reversing circuit directly to the motor.

4. A system of the character claimed in claim 1, in which the phase reversing circuit includes a phase reversing first switch between the synchro generating means and the synchro differential means, a phase reversing second switch between the synchro differential means and the synchro output means, a phase reversing third switch for the output of the synchro output means, a polarity reversing fourth switch in the polarity switching circuit, and said pulse output means includes a cyclically operable relay having an armature and mechanical means operatively connecting said first, second, third and fourth switches to the armature.

5. A system of the character claimed in claim 4, including an open circuit for bypassing the relay and the polarity switching circuit, and switching means operable to close said bypass circuit and connect the output of the phase reversing circuit directly to the motor.

6. A system of the character claimed in claim 1, in which the phase reversing circuit includes a phase reversing first switch between the synchro generating means and the synchro differential means, a phase reversing second switch between the synchro differential means and the synchro output means, a phase reversing third switch for the output of the synchro output means, and said pulse output means includes a cyclically operable relay having an armature and mechanical means operatively connecting said first, second and third switches to the armature.

7. A scanning system for oscillating a rotatable element through a determined sector in relation to a determined angular reference position including a reversible D.C. motor connected to drive the element; a circuit providing a phase reversing output including a synchro generator having a rotor driven by the motor, a first channel with a first synchro differential connected to the generator having a stator and rotor, and a first output synchro connected to the differential having a stator and rotor, a second channel with a second synchro differential connected to the generator having a stator and rotor, and a second output synchro connected to the second differential having a stator and rotor arranged in phase opposition to the first channel, a common connection between the rotors of the first and second generators adjustable angularly to determine the width of the scanning sector, and a common connection between the rotors of the first and second transformers adjustable angularly to determine the angular reference position; means for operating and reversing the direction of operation of the D.C. motor including a polarity switching circuit, and means providing a differential pulse output for operating said switching circuit depending on the adjusted output of the phase reversing circuit.

8. A system of the character claimed in claim 7, in which said differential pulse output means includes a bistable multivibrator, and said polarity switching circuit includes transistor bridge.

9. A scanning system for oscillating a rotatable element through a determined sector in relation to a determined angular reference position including a reversible D.C. motor connected to drive the element; a circuit providing a phase reversing output including a synchro generator having a rotor driven by the motor, a synchro differential having a stator and a phase changing rotor adjustable angularly with respect to one another to determine the width of the scanning sector, a phase reversing first switch between the synchro generator and the synchro differential, an output synchro having a stator and phase changing rotor adjustable angularly with respect to one another to determine the angular reference position, a phase reversing second switch between the synchro differential and the output synchro, and a phase reversing third switch for the output of the synchro transformer; means for operating and reversing the direction of operation of the D.C. motor including a circuit with a polarity reversing fourth switch, and means providing a differential pulse output for operating said first, second, third and fourth switches depending on the adjusted output of the phase reversing circuit.

10. A system of the character claimed in claim 9 in which said pulse output means includes a cyclically operable relay having an armature, and a pawl and ratchet mechanism operatively connecting said first, second, third and fourth switches to the armature.

11. In a scanning system for oscillating a rotatable element through a determined sector in relation to a determined angular reference position, a reversible motor connected to drive the element, and means for operating the motor including a circuit providing a phase reversing output having synchro generating means with a rotor driven by the motor, synchro differential means having stator and phase changing rotor parts adjustable angularly with respect to one another to determine the width of the scanning sector, and synchro output means having stator and phase changing rotor parts adjustable angularly with respect to one another to determine the angular reference position.

12. In a scanning system for oscillating a rotatable element through a determined sector in relation to a determined angular reference position, a reversible motor connected to drive the element, and means for operating the motor including a circuit providing a phase reversing output having synchro generating means with a rotor driven by the motor, a first channel with a first synchro differential having a stator and rotor, and a first output synchro having a stator and rotor, a second channel with a second synchro differential having a stator and rotor, and a second output synchro having a stator and rotor arranged in phase opposition to the first channel, a common connection between the rotors of the first and second differentials adjustable angularly to determine the width of the scanning sector, and a common connection between the rotors of the first and second output synchros adjustable angularly to determine the angular reference position.

13. In a scanning system for oscillating a rotatable element through a determined sector in relation to a determined angular reference position, a reversible motor connected to drive the element, and means for operating the motor including a circuit providing a phase reversing output having a synchro generator with a rotor driven by the motor, a synchro differential having a stator and a pulse changing rotor adjustable angularly with respect to one another to determine the width of the scanning sector, a phase reversing switch between the synchro generator and the synchro differential, an output synchro having a stator and phase changing rotor adjustable angularly with respect to one another to determine the angular reference position, a phase reversing second switch between the synchro differential and the output synchro, and a phase reversing third switch for the output of the output synchro.

References Cited in the file of this patent

UNITED STATES PATENTS

| | | |
|---|---|---|
| 2,486,151 | Gross | Oct. 25, 1949 |
| 2,648,038 | Morse et al. | Aug. 4, 1953 |
| 2,767,363 | Chubb | Sept. 10, 1953 |
| 2,652,523 | McCartney et al. | Sept. 15, 1953 |

FOREIGN PATENTS

| | | |
|---|---|---|
| 598,573 | Great Britain | July 17, 1945 |